United States Patent [19]
White

[11] 4,344,151
[45] Aug. 10, 1982

[54] ROM-BASED COMPLEX MULTIPLIER USEFUL FOR FFT BUTTERFLY ARITHMETIC UNIT

[75] Inventor: Stanley A. White, Santa Ana, Calif.

[73] Assignee: Rockwell International Corporation, El Segundo, Calif.

[21] Appl. No.: 142,594

[22] Filed: Apr. 21, 1980

[51] Int. Cl.³ ........................... G06F 7/52; G06F 1/02
[52] U.S. Cl. ..................................... 364/754; 364/726
[58] Field of Search ................ 364/754, 757, 726, 736

[56] References Cited

U.S. PATENT DOCUMENTS

| | | | |
|---|---|---|---|
| 3,588,460 | 7/1968 | Smith | 364/726 |
| 3,686,490 | 8/1972 | Goldstone | 364/726 |
| 3,746,848 | 7/1973 | Clary | 364/726 |
| 3,800,130 | 3/1974 | Martinson et al. | 364/726 |
| 3,926,367 | 12/1975 | Bond et al. | 364/754 |

OTHER PUBLICATIONS

Tokoro, "Fast Fourier Transform by Hardware", *Systems Computers Controls,* vol. 6, No. 5, 1975, pp. 58-67, 364/726.
Singh, "Binary Multiplier Circuit Using Read-Only Memory" *IBM Tech. Disclosure Bulletin,* vol. 14, No. 10, Mar. 1972, pp. 2981-2982, 364/757.
Hemel, "Making Small ROM's Do Math Quickly, Cheaply & Easily" *Electronics,* May 11, 1970, pp. 104-111, 364/757.
Finn, "LSI Hardware Implements Signal Processing Algorithms" *Computer Design,* vol. 19, No. 3, Mar. 1980, pp. 137-142, 364/754.

*Primary Examiner*—David H. Malzahn
*Attorney, Agent, or Firm*—H. Fredrick Hamann; Rolf M. Pitts

[57] ABSTRACT

A four-port digital complex multiplier useful for FFT butterfly arithmetic units and in which ROM's are employed as square function look-up tables. Each of the four ports is responsive to a respective one of the component values of two complex numbers. The square-function look-up memories are responsive to various ones of the input ports and cooperate with quarter-square-multipliers to provide component complex products. An output subtractor and an output summer, responsive to mutually exclusive pairs of the quarter-square multipliers, provide a respective real and imaginary component of the product of the two complex numbers.

12 Claims, 9 Drawing Figures

ROM-BASED COMPLEX MULTIPLIER USEFUL FOR FFT BUTTERFLY ARITHMETIC UNIT

CO-PENDING APPLICATIONS

1. U.S. Application Ser. No. 130,653 filed Mar. 17, 1980, for A ROM-BASED PARALLEL DIGITAL ARITHMETIC DEVICE by Stanley A. White.
2. U.S. Application Ser. No. 092,387, (now U.S. Pat. No. 4,275,452) filed Nov. 8, 1979 for SIMPLIFIED FAST FOURIER TRANSFORM BUTTERFLY ARITHMETIC UNIT by Stanley A. White.

BACKGROUND OF THE INVENTION

1. Field of Invention

The concept of the invention relates to an improved complex multiplier for use in a simplified FFT butterfly arithmetic unit.

2. Description of the Prior Art

In the field of spectral analysis by digital machine means, and more particularly in sequency analyzers such as fast fourier transform devices, machine mechanizations of the algorithm to be solved have been quite complex and expensive, as to limit the applications of and markets for such machines. A key function in such mechanization is the multiplication of two complex values.

In the digital fast fourier processing of a sampled time history of say N samples over the sampled signal epoch of interest, successive samples are treated as complex quantities and are organized as two groups of sequences, each occurring in a mutually exclusive one of a first half and second half (A and B) of the sampled epoch. As is more fully explained in U.S. Pat. No. 4,158,888 to Shapiro for FAST FOURIER TRANSFORM PROCESSOR USING SERIAL PROCESSING AND DECODER ARITHMETIC AND CONTROL SECTION, the FFT processor may be characterized as a digital processor which repetitively performs the basic computations $AW+B$ and $AW-B$, where A and B are complex digital words, each corresponding to a different one of N digital samples to be analyzed, and W is a complex digital word corresponding to a weighting function or "twiddle factor". Mechanization involves use of a multiplier to provide components of the complex product AW, storage means to store such product, and an adder/subtractor for combining such stored product to generate the complex product AW and to combine this complex product with the components of the complex variable B.

Detailed arithmetic processing of the sequential computations in a sequency analyzer or FFT machine, as a practical matter, involves reorganizing the discrete fourier transform data matrix into submatrices, each of which requires simpler arithmetic operations, and the results of which simpler operations may be merely simply combined, rather than multiplied. Such reorganization process is referred to generically as decimation, the two classical methods of reorganizing the data matrix being referred to as decimation-infrequency and decimation-in-time. The basic resultant computational operation is called a "butterfly".

A fuller discussion of the FFT "butterfly" arithmetic for both decimate-in-frequency and decimate-in-time applications, is provided in my co-pending Application Ser. No. 092,387 filed Nov. 8, 1979 for SIMPLIFIED FAST FOURIER TRANSFORM BUTTERFLY ARITHMETIC UNIT (now issued as U.S. Pat. No. 4,275,452). A yet more general discussion may be found in the text "Digital Signal Processing" by Peled and Liu, published by John Wiley and Sons, New York (1976). The above-noted co-pending patent application is directed to reducing the machine steps and arithmetic sequences involved in performing the bufferfly computation. Such reference discloses a simplified butterfly arithmetic unit employing a pair of registers for storing the respective sum and difference of the components, $W_R$ and $W_I$, of the complex-butterfly twiddle factor, W, as phase-shifted cosine values. Controlled switching of two accumulators, responsive to alternate ones of the sum and difference registers, allows generation of the complex weighted butterfly output function, $y=wz$, without the necessity of discrete multipliers.

Such use of discrete multipliers has long been a source of machine complexity and limited machine speed. While the use of such discrete multipliers may be successfully avoided by means of my above-noted co-pending application, Ser. No. 092,387 (now U.S. Pat. No. 4,275,452), yet the use of discrete multipliers can be rendered less onerous by the use of a "lock-up table" type complex multiplier, employing square-function read-only memories (ROM's) in a quarter-square multiplier type configuration, in accordance with the inventive concept disclosed more fully hereinafter.

SUMMARY OF THE INVENTION

By means of the concept of the invention there is provided a four-port digital complex multiplier means for overcoming the above-noted limitations of the prior art and for enabling a more efficient performance of the FFT butterfly arithmetic. Such multiplier means employs ROM's as square function look-up tables. Each of the four ports is responsive to a respective one of the component values of two complex numbers. The square function lock-up memories are coupled to various ones of the input ports, and cooperate with quarter-square multiplier means to provide component complex products. An output subtractor and an output summer, responsive to mutually exclusive pairs of the quarter square multipliers, provide a respective real and imaginary component of the product of the two complex numbers.

In a preferred embodiment of the invention, a digital arithmetic device is provided for performing the multiplication of two complex values. There is included eight square function memories, a first, second, third and fourth one of the memories being responsive to at least a respective one of four input ports of the device for providing values indicative of the respective squares of the values supplied by such ports. A fifth, sixth, seventh and eighth one of the memories is responsive to a mutually exclusive pair of the four input pairs of the input ports for providing values indicative of the respective squares of a preselective combination of the mutually exclusive input pairs. A first quarter-square multiplier responsively coupled to the outputs of at least the first and fifth memories provides an output indicative of a first product; a second quarter-square multiplier responsively coupled to the outputs of at least the second and sixth memories provides an output indicative of a second product; a third quarter-square multiplier responsively coupled to the outputs of at least the third and seventh memories provides an output indicative of a third product; and a fourth quarter-square multiplier responsively coupled to the outputs of at least the fourth and eighth memories provides an output indicative of a fourth product. A first digital combiner is responsively coupled to the outputs of the first and third quarter-square multipliers provides an output indicative of the real component of the complex product AB of the two complex numbers of interest, and a second digital combiner responsively coupled to the output of said second and fourth quarter-square multipliers provides an output indicative of the imaginary component of such complex product.

In normal operation of the above-described arrangement, the squares of the component values are merely looked-up in response to the memories being addressed by such component values, the various squared values being selectively combined in the manner of quarter square multiplication to effect several component values of the real and imaginary components of the complex product. The combination of the several component values for each component of the complex product results in the determination of the complex product in resolved form.

Such parallel-addressed look-up table technique in combination with the quarter-square method provides a simplified mechanization for a complex multiplier which, in combination with a complex adder and complex subtractor, further provides convenience and simplification in the mechanization of a FFT butterfly arithmetic unit. Such simplification allows the processing of increased bandwidths with improved resolution, and reduced processing time.

Accordingly, it is an object of the invention to provide an improved device for performing complex multiplication.

It is another object of the invention to perform complex multiplication by means of a ROM-based quarter-square multiplier technique.

A still further object is to provide a simpler mechanization for performing FFT butterfly arithmetic.

These and other objects of the invention will become apparent from the following discription, taken together with the accompanying drawings in which:

BRIEF DESCRIPTION OF THE DRAWINGS

In the drawings, like reference characters refer to like parts.

DESCRIPTION OF THE PREFERRED EMBODIMENTS

Figure 1:
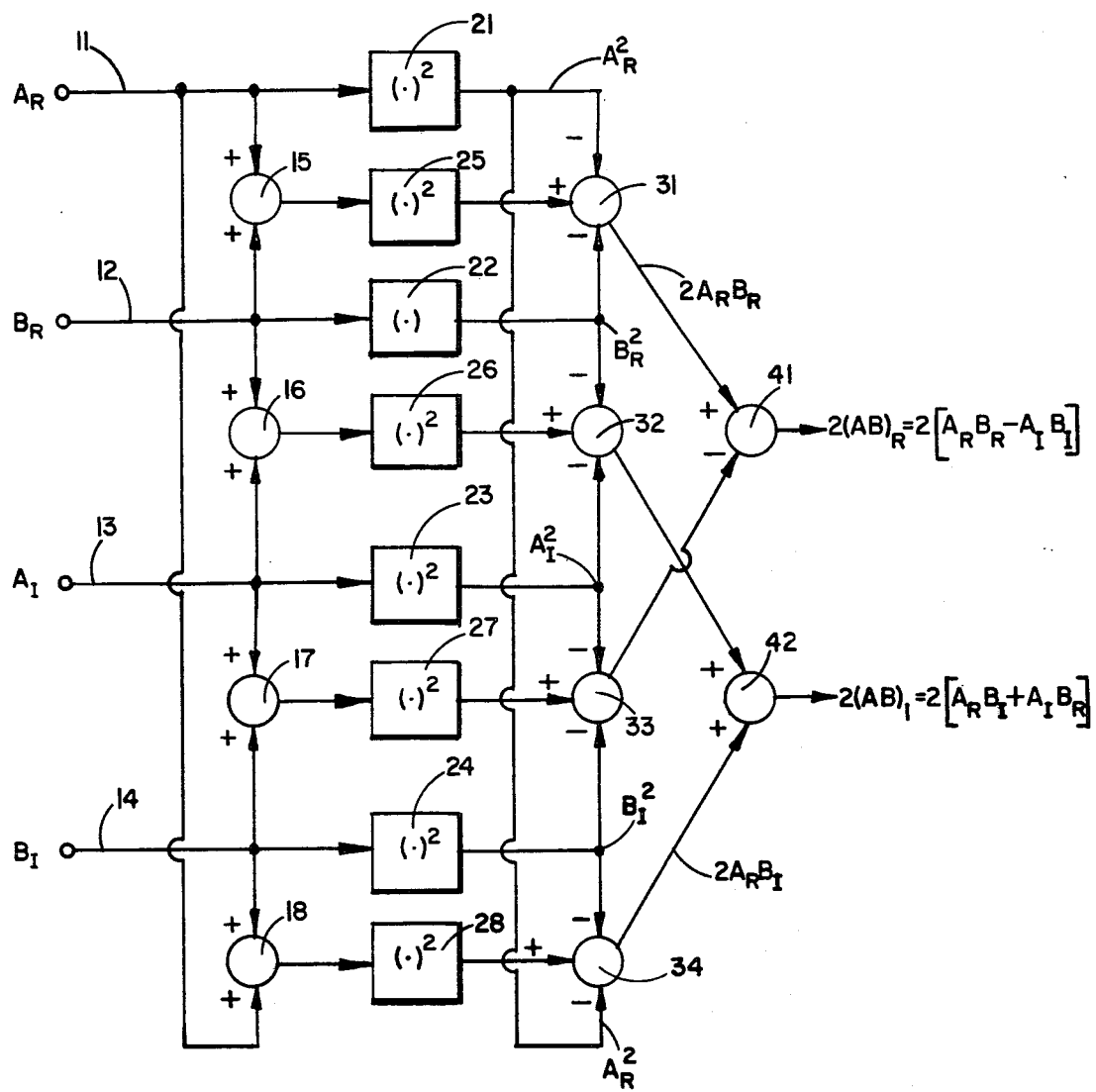
FIG. 1 is a block diagram of a complex multiplier illustrating one aspect of the invention.

Referring now to FIG. 1, there is schematically illustrated in block diagram form a digital signal processing system embodying an aspect of the inventive concept. There is provided a digital arithmetic device for performing multiplication of two complex values, $A = (A_R + jA_I)$ and $B = (B_R + jB_I)$, and comprising four input ports 11, 12, 13 and 14 and representing the applied complex component values, $A_R$, $B_R$, $A_I$ and $B_I$, respectively; four input summing means 15, 16, 17 and 18. There is also provided eight square function memories 21, 22, 23, 24, 25, 26, 27 and 28, of which elements 21, 22, 23 and 24 represent a respective first, second, third and fourth one of said memories, responsive to a respective one of input ports 11, 12, 13 and 14, as illustrated, for providing values indicative of the respective squares thereof, $A_R^2$, $A_I^2$, $B_R^2$, $B_I^2$. Elements 25, 26, 27 and 28 represent a respective fifth, sixth, seventh and eighth one of said memories, responsive to a respective one of said four input summing means 15, 16, 17 and 18, each of said input summing means, in turn, being responsive to a mutually exclusive pair of the four input pairs of the input ports ($A_R$, $B_R$), ($B_R$, $A_I$), ($A_I$, $B_I$), and ($B_I$, $A_R$) for providing values indicative of the respective squares of said respective summed input pairs $(A_R+B_R)^2$, $(B_R+A_I)^2$, $(A_I+B_I)^2$ and $(B_I+A_R)^2$. A first three-input adder 31 is responsively coupled to the outputs of the first, second and fifth (i.e., elements 21, 22 and 25) for providing an output indicative of the product $A_R B_R$; a second three-input adder 32 is responsively coupled to the outputs of the second, third and sixth memories (i.e., elements 22, 23 and 26) for providing an output indicative of the product $A_I B_R$; a third three-input adder 33 is responsively coupled to the outputs of said third, fourth and seventh memories (i.e., elements 23, 24 and 27) for providing an output indicative of the product $A_I B_I$; and a fourth three-input adder 34 responsively coupled to the outputs of said first, fourth and eighth memories (i.e., elements 21, 24 and 28) for providing an output indicative of the product $A_R B_I$. A subtractor 41 responsively coupled to the outputs of said first and third three-input adder provides an output indicative of the real component of the complex product AB, and an adder 42 responsively coupled to the output of said second and fourth three-input adders for providing an output indicative of the imaginary component of the complex product AB.

In normal operation of the arrangement of FIG. 1, the cooperation of each of digital combiners 31, 32, 33 and 34 with its three associated square function memories and input summing means as a multiplier is the same, an appreciation of which may be obtained by a consideration of first digital combiner 31, first, second and fifth memories 21, 22 and 25 and central memory input summing means 15. Such multiplier arrangement in FIG. 1 processes the two factors $A_R$ and $B_R$ by means of digital summer 15 to provide the value $[A_R+B_R]$, applied as an address input to square function memory 25. The readout of central memory 25 to such address is the square, $[A_R+B_R]^2$. Similarly applying the inputs $A_R$ and $B_R$ as respective addresses to first and second memories 21 and 22 provides the respective read-outs $A_R^2$ and $B_R^2$. Digital combiner 31 differentially combines the output $[A_R+B_R]^2$ of memory 25 with the sum $[A^2+B^2]$ of the outputs of memories 21 and 22:

$$[A_R+B_R]^2-[A^2+B^2]=[A_R^2+2A_RB_R+B_R^2]-[A^2+B^2] \quad (1)$$

$$[A_R+B_R]^2-[A^2+B^2]=2A_RB_R \quad (2)$$

Accordingly, it is to be appreciated that the illustrated arrangement of digital combining means 31 in FIG. 1 functions to provide an output indicative of the scalar product of the two values on input ports 11 and 12, corresponding to one component of the value of the real portion $(AB)_R$ of the complex product AR. Similarly, the digital combiner 33 in cooperation with elements 17, 23, 24 and 27 provide an output $A_IB_I$ indicative of the scalar product of the two values on input ports 13 and 14, and corresponding to another component of the value of the real portion of the complex product AB. Thus, it may be appreciated that digital combining means 32 and 34, being similarly arranged as digital combining means 31 and 32, similarly cooperate to provide respective values, $2A_IB_R$ and $2A_RB_I$, indicative of components of the value of the imaginary portion $(AB)_I$ of the complex product AB, such value occurring as the output of adder 42. Subtractor 41 differentially combines the scalar components as $(2A_RB_R-2A_IB_I)$ to provide an output indicative of the real component $(AB)_R$ of the complex product $AB=(A_R+jA_I)(B_R+jB_I)$.

Figure 2:
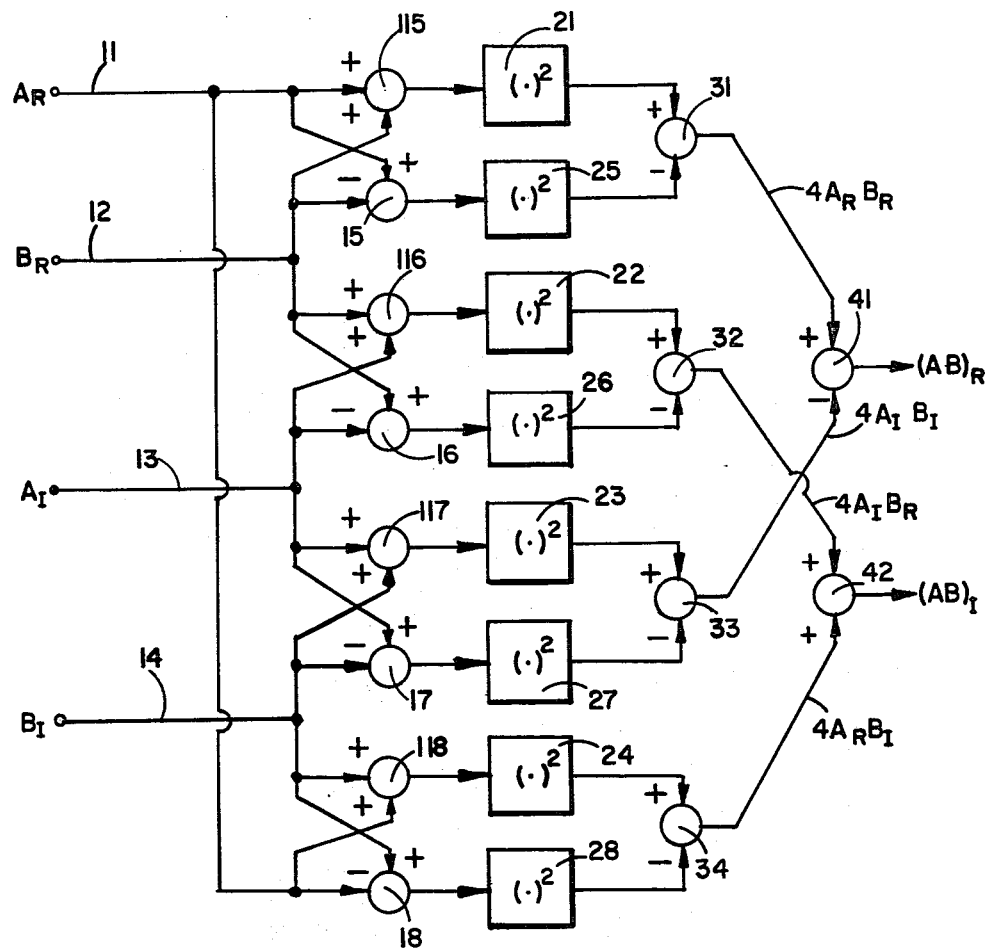
FIG. 2 is a block diagram of an alternate embodiment of complex multiplier illustrating a further aspect of the invention.

An alternate arrangement of the complex multiplier device of FIG. 1 is shown in FIG. 2.

Referring now to FIG. 2, there is schematically illustrated in block diagram form an alternate embodiment of the concept of the invention. There is provided a digital arithmetic device for performing multiplication of the two complex values, $A=(A_R+jA_I)$ and $B=(B_R+jB_I)$ and comprising four input ports, 11, 12, 13, and 14, eight square function memories, 21, 22, 23, 24, 25, 26, 27 and 28; and four output combining means 31, 32, 33 and 34, output subtractor 41 and output adder 42, as in FIG. 1, but with the following differences. Elements 21, 22, 23 and 24, representing a first, second, third and fourth one of the memories are each responsive to a respective sum of a pair of the input ports, as illustrated, for providing values indicative of the respective squares of said respective sums, $(A_R+B_R)^2$, $(B_R+A_I)^2$, $(A_I+B_I)^2$ and $(B_I+A_R)^2$. Also, elements 25, 26 27 and 28, representing a respective fifth, sixth, seventh and eighth one of the memories are each responsive to a difference between the ports of a mutually exclusive pair of the input ports for providing values indicative of the respective squares of the respective differences, $(A_R-B_R)^2$, $(B_R-A_I)^2$, $(A_I-B_I)^2$ and $(B_I-A_R)^2$. First digital combiner 31 is responsively coupled to the outputs of first and fifth memories 21 and 25 for providing an output indicative of the product $A_RB_R$; a second digital combiner 32 is responsively coupled to the outputs of second and sixth memories 22 and 26 for providing an output indicative of the product $A_IB_R$; a third digital combiner 33 is responsively coupled to the outputs of third and seventh memories 23 and 27 for providing an output indicative of the product $A_IB_I$; and a fourth digital combiner 34 is responsively coupled to the outputs of fourth and eighth memories 24 and 28 for providing an output indicative of the product $A_RB_R$.

Figure 8:
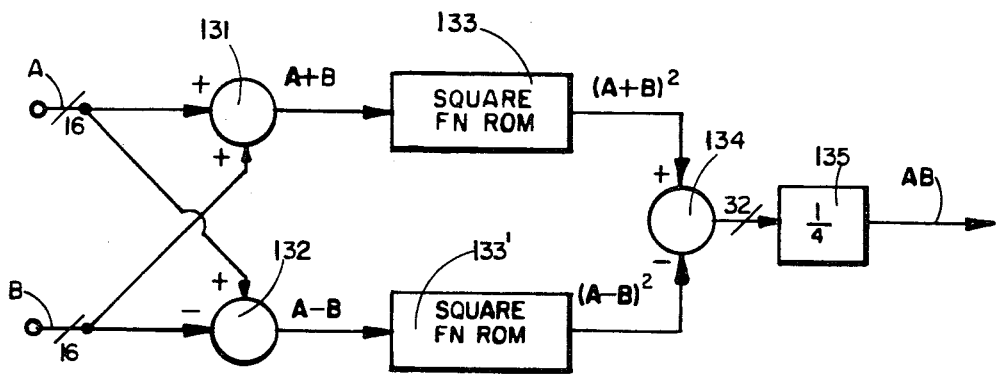
FIG. 8 is a block diagram of a quarter-square multiplier.

In normal operation of the arrangement in FIG. 2 as a complex multiplier, each pair of square function memories, set of adder and subtractor and associated one of output differential combining means 31, 32, 33 and 34 cooperate as a quarter-square multiplier, as shown more particularly in FIG. 8.

Referring to FIG. 8, there is shown a quarter-square multiplier comprising a parallel adder 131 and a parallel subtractor 132 having two common inputs A and B (each shown as being an exemplary 16-bit parallel input). A first square function memory 133, having an address input coupled to the output of adder 131, provides a read-out $(A+B)^2$ indicative of the square of the sum of the inputs to element 131. A second square function memory 133', having an address input coupled to the output of subtractor 132, provides a read-out $(A-B)^2$ indicative of the square of the difference between the inputs to element 132. An output subtractor 134, input coupled to the outputs of look-up memories 133 and 133', provides an output corresponding to the difference between the outputs of the two memories 133 and 133':

$$(A+B)^2-(A-B)^2=[A^3+2AB+B^2]-[A^2-2AB+B^2] \quad (3)$$

$$(A+B)^2-(A-B)^2=4AB. \quad (4)$$

Such output (4AB) of element 134 is thus seen to be indicative of the product of the two inputs A and B, but for a scaling factor which may be applied by an attenuation element 135 or included in the scaling of subtractor 134 or by any other convenient means well understood in the art, as explained more fully in my co-pending application Ser. No. 130,653 filed Mar. 17, 1980 for A ROM-BASED PARALLEL DIGITAL ARITHMETIC DEVICE. As is also explained in such co-pending application, the size of the look-up memory capacity required to perform such square function in the quarter-square multipliers of FIGS. 1, 2 and 9 hereof may be substantially reduced by the use of the concept of a fully parallel arithmetic square-by-parts type of mechanization. An exemplary mechanization of such concept, as disclosed in the above-noted co-pending application, is shown in FIG. 7.

Figure 7:
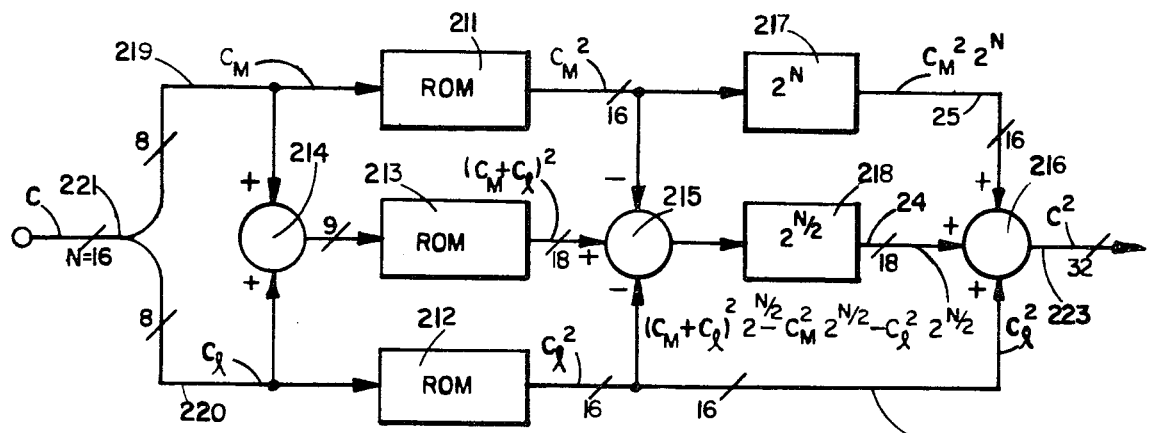
FIG. 7 is a block diagram of a digital arithmetic device embodying a square-by-parts concept.

Referring to FIG. 7, there is provided a fully-parallel digital arithmetic device for obtaining the square, $C^2$, of a value, C, via parts of the value C and involving a reduction in memory requirements. As illustrated, the device of FIG. 7 has 16 parallel inputs (corresponding to $2^{16}$ or 1024 unsigned addresses), although the concept is not so limited and any even number of unsigned addresses may be used. Three square function ROM's 211, 212 and 213, are employed, one (element 211) responsive to the most significant-bits half $(C_M)$ of a parallel input, the second ROM 112 responsive to the least-significant bits half $(C_1)$ of the parallel input, and the third one 133 responsive to the sum of said most significant bits and least-significant bits. The outputs of the square function ROM's are then combined and scaled to effect a square-by-parts of the applied input value, C, by means of elements 215, 216, 217 and 218.

That this output corresponds to the value, $C^2$, may be seen as follows: First, define C as the sum of two component values, A and B, where A corresponds to the value contributed by the MSB half $C_M$ and B corresponds to the value contributed by LSB half, $C_I$:

$$C = A + B \tag{5}$$

where:
$A = 2^{N/2} C_M$
$B = C_I$ and
$N =$ the bit size or number of bits of C.
Therefore:

$$C = 2^{N/2} C_M + C_I \tag{6}$$

Squaring $$C^2 = [2^{N/2} C_M + C_I]^2 = 2^N C_M{}^2 + 2^{N/2+1} C_M C_I + C_I{}^2 \tag{7}$$

The right hand member of Equation (7) is seen to be identical to the mechanization illustrated in FIG. 7, as to illustrate a novel square-by-parts method of mechanization. For the 16-bit input word size (i.e., N=16) 32-bit word size output illustrated in FIG. 7, two ROM's (elements 211 and 212), each require $2^8 - 1$ or 255 addresses, with 16 bits per address, a total of $255 \times 16$ or 4,080 bits per ROM. The center ROM (element 213) requires a $2^9 - 1$ or 511 addresses with 18 bits per address or a total of 9,198 bits. Thus, the three ROM's represent a memory requirement of only 17,358 bits, as compared to a corresponding single square function memory requirement of $(2^{2N} - 1)$ addresses with 32 bits per address for a total of $1.4 \times 10^{11}$ bits.

Still further economies may still be effected in the square function look-up memory requirements, as are also explained in my above-noted co-pending application Ser. No. 130,653 filed Mar. 17, 1980.

Figure 9:
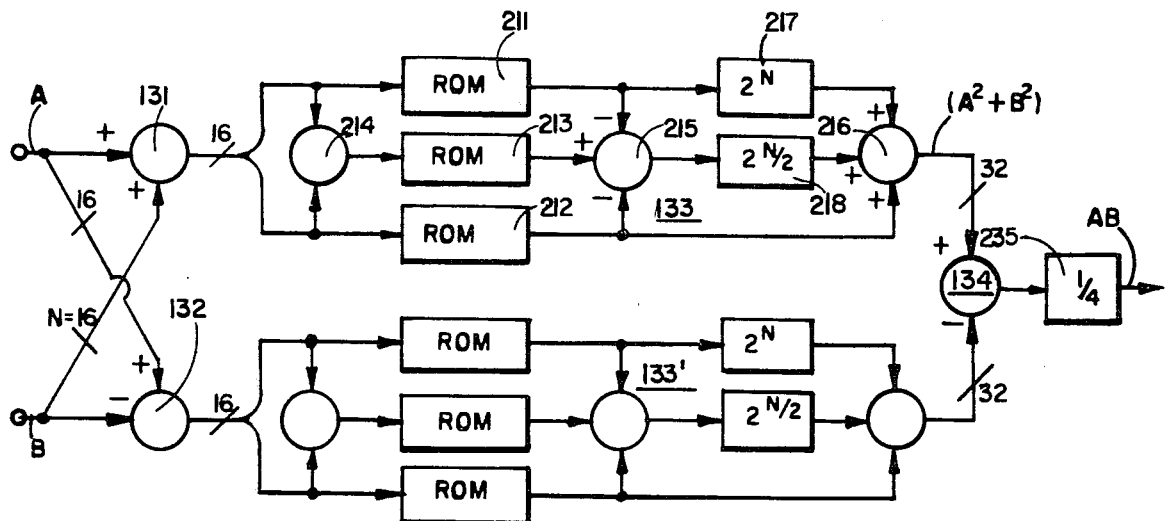
FIG. 9 is a block diagram of the quarter-square multiplier of FIG. 8, embodying the square-by-parts concept of FIG. 7.

A pair of such arithmetic devices, each corresponding to the arrangement of FIG. 7, may be advantageously combined to economically effect the product AB of two values, A and B, in the manner of a quarter-square multiplier. For example, such a device may be substituted for each of elements 133 and 133' in FIG. 8, as shown in FIG. 9. Similarly, such device may be substituted for any square function look-up memory shown in FIGS. 1-6, whereby the advantages of high-speed parallel processing and reduced memory size may be realized, as disclosed more fully in my above-noted co-pending application Ser. No. 130,653 filed Mar. 17, 1980.

Figure 3:
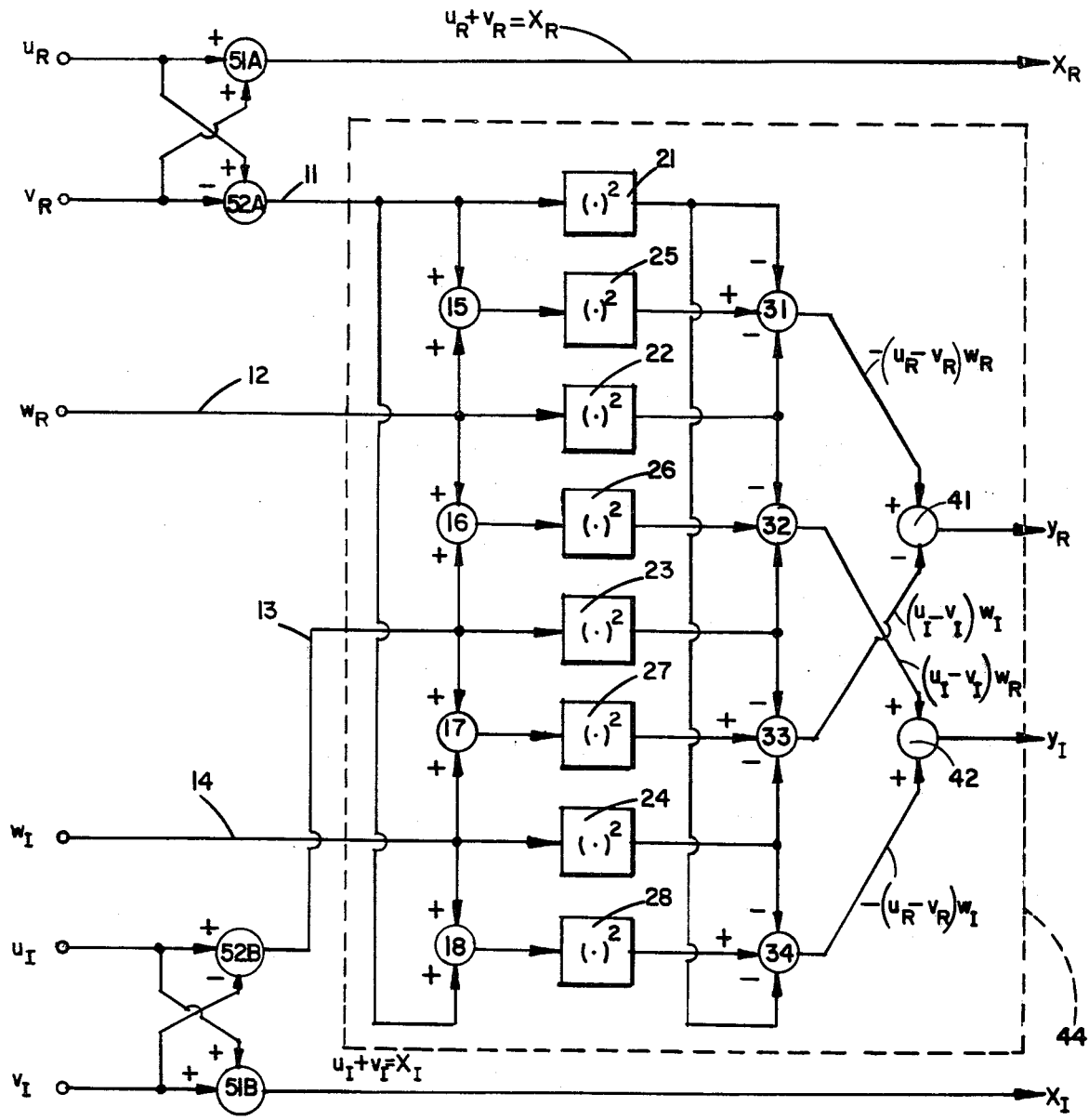
FIG. 3 is a block diagram of a fast fourier transform device employing a decimate-in-frequency-type butterfly arithmetic, and embodying the concept illustrated in FIG. 1.
Figure 4:
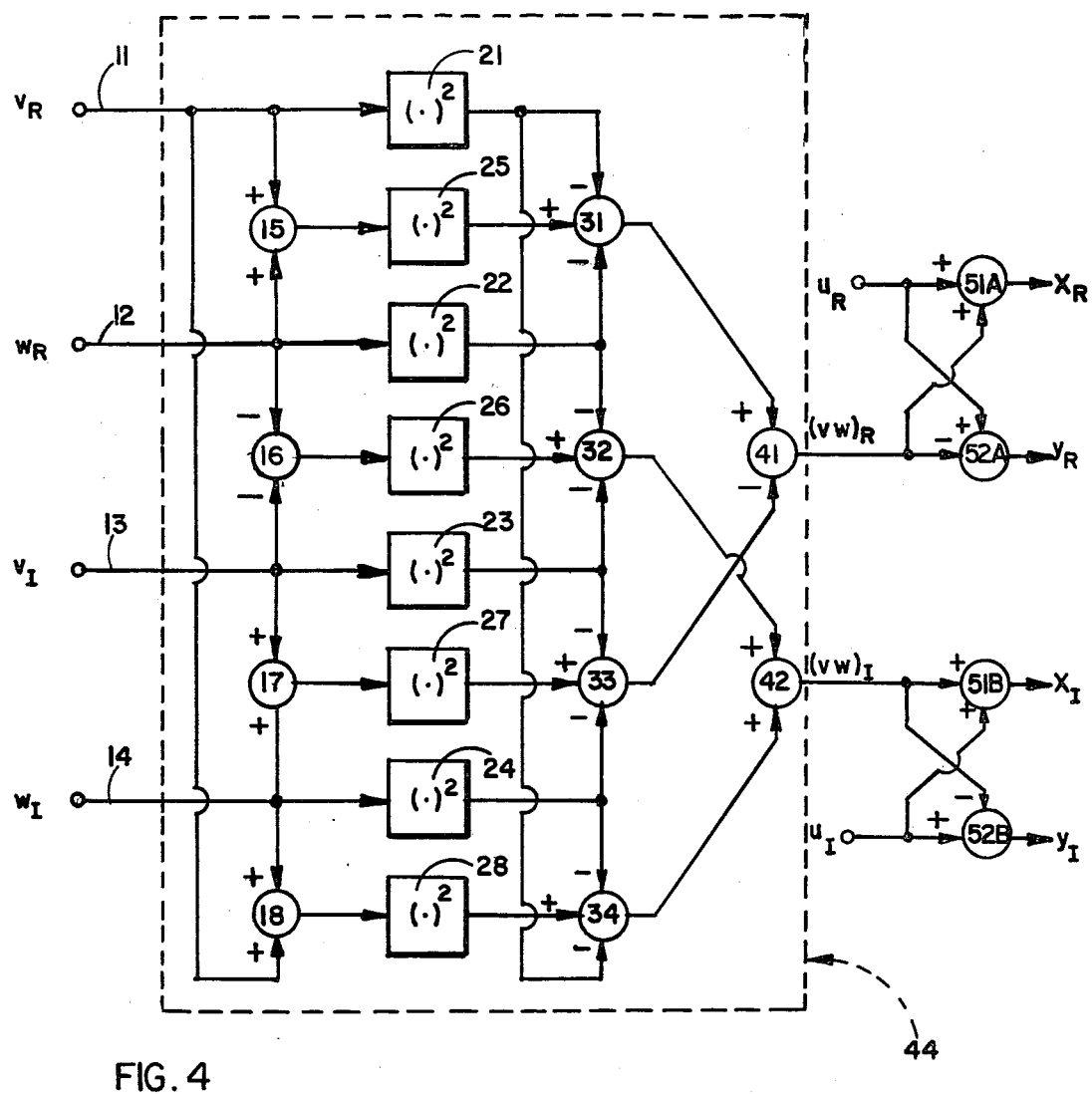
FIG. 4 is a block diagram of a fast fourier transform device employing a decimate-in-time type butterfly arithmetic, and embodying the concept illustrated in FIG. 1.
Figure 5:
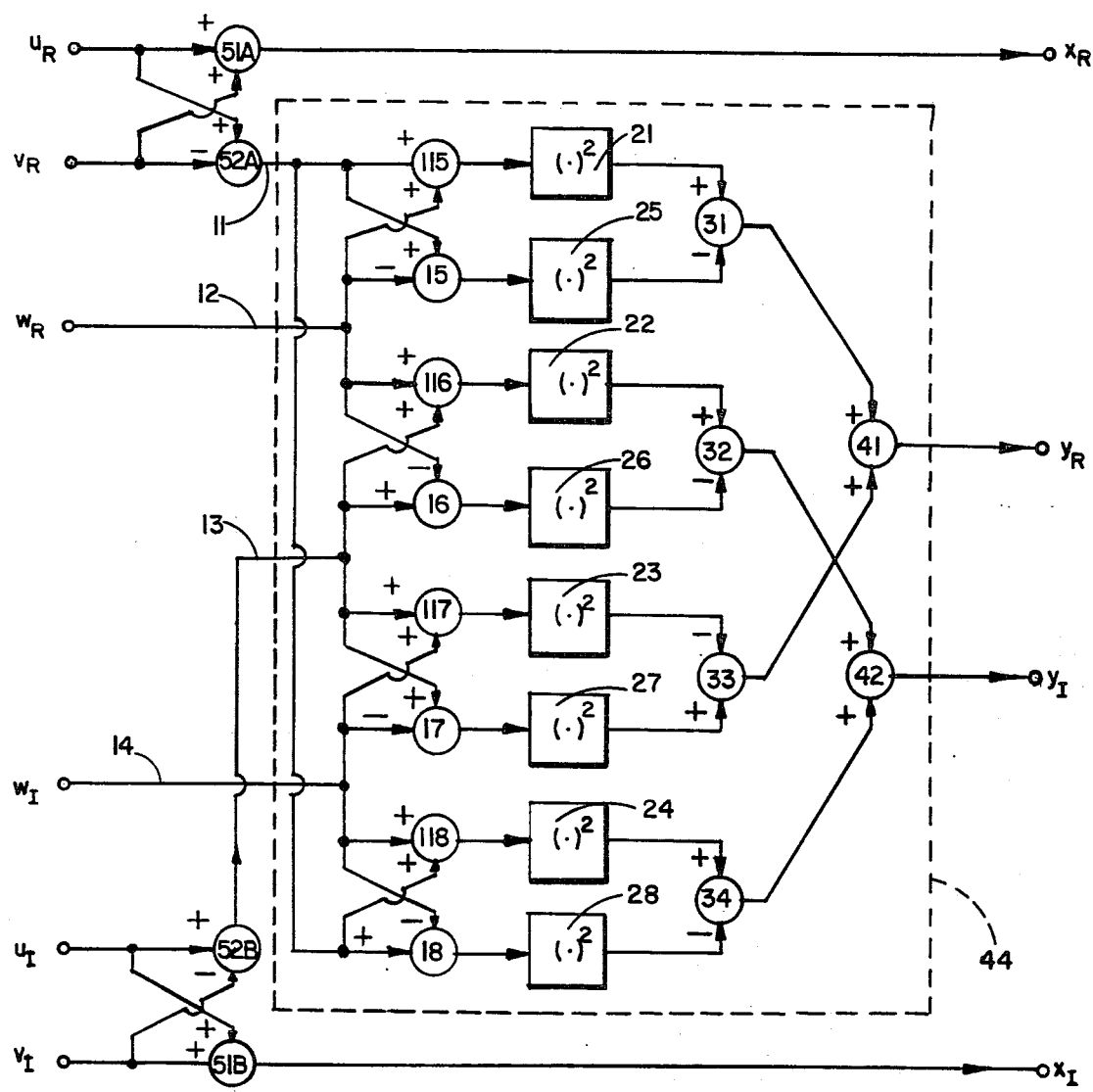
FIG. 5 is a block diagram of a fast fourier transform device employing a decimate-in-frequency type butterfly arithmetic and embodying the concept illustrated in FIG. 2.
Figure 6:
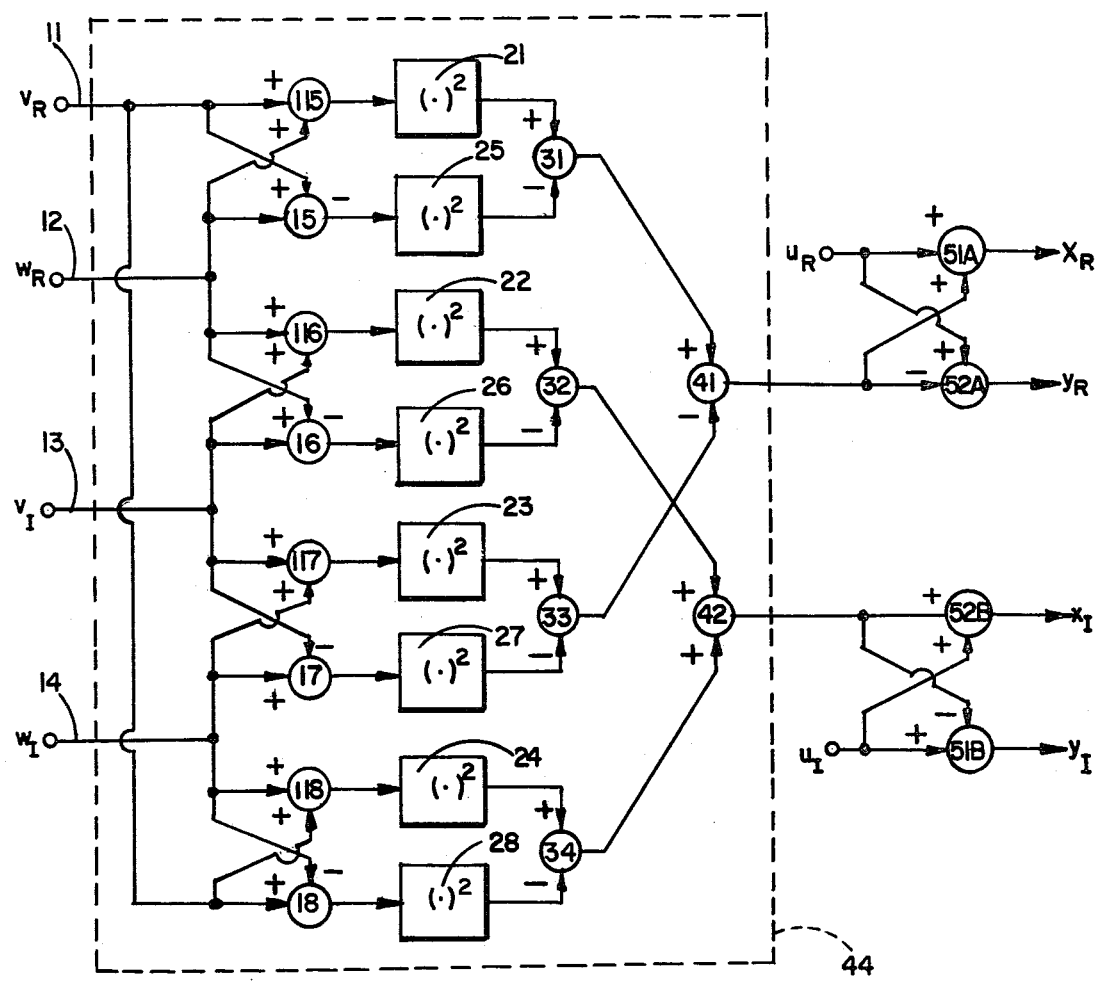
FIG. 6 is a block diagram of a fast fourier transform device employing a decimate-in-time type butterfly arithmetic and embodying the concept illustrated in FIG. 2.

Efficient digital arithmetic means, employing look-up square function memories, for performing complex multiplication, having been disclosed, application of such digital arithmetic means to fast fourier transform analyzers will now be shown, by aid of FIGS. 3, 4, 5 and 6. FIGS. 3 and 5 illustrate a decimate-in-frequency type FFT butterfly unit and FIGS. 4 and 6 illustrate a decimate-in-time type FFT butterfly unit. FIGS. 3 and 4 illustrate alternate embodiments of the complex multiplier arrangement disclosed in FIG. 1, while FIGS. 5 and 6 illustrate embodiments of the complex multiplier arrangement disclosed in FIG. 2.

Referring to FIG. 3, there is illustrated a decimate-in-frequency type FFT butterfly arithmetic for performing the complex arithmetic operations:

$$u + v = x \tag{8}$$

$$(u - v)w = y \tag{9}$$

where u, v, w, x and y are all complex values. More particularly:

$$u_R + v_R = x_R \tag{10a}$$

$$u_I + v_I = x_I \tag{10b}$$

$$(u_R - v_R)w_R - (u_I - v_I)w_I = y_R \tag{11a}$$

$$(u_R - v_R)w_I + (u_I - v_I)w_R = y_I \tag{11b}$$

The combination of elements for performing such arithmetic operation are a complex adder 51A and 51B for effecting the respective real and imaginary sums indicated by Equations (10a) and (10b); a complex subtractor 52A and 52B for effecting the respective real and imaginary differences $(u_R - v_R)$ and $(u_I - v_I)$; and a complex multiplier 44 for multiplying the resolved differences by the corresponding component values $w_R$ and $w_I$ of the resolved complex twiddle factor w. The result of such complex multiplication is the values of the components $y_R$ and $y_I$ of the resolved complex product, indicated by Equations (11a) and (11b).

In such arrangement, input terminals 11 and 12 of multiplier 44 are responsively coupled to the respective output of complex subtracting elements 52A and 52B, and input terminals 12 and 14 are responsively coupled to a respective input source indicative of the values $w_R$ and $w_I$, whereby the resolved complex product thereof appears at the outputs of elements 41 and 42 as $y_R$ and $y_I$, respectively, of the decimate-in-frequency FFT butterfly arithmetic process.

The alternate embodiment in FIG. 4 illustrates a decimate-in-time type FFT butterfly arithmetic unit, comprised of a complex multiplier 44, complex adder 51A and 51B, and complex subtractor 52A and 52B. By means of such arrangement, the following complex arithmetic operation is performed:

$$u + vw = x \tag{12}$$

$$u - vw = y \tag{13}$$

More particularly:

$$u_R + (vw)_R = x_R \tag{14a}$$

$$u_I + (vw)_I = x_I \tag{14b}$$

$$u_R - (vw)_R = y_R \tag{15a}$$

$$u_I - (vw)_I = y_I \tag{15b}$$

In such arrangement, input terminals 11 and 13 of multiplier 44 are respectively coupled to an input source indicative of the component values $v_R$ and $v_I$, respectively, of the resolved complex number, v; and input terminals 12 and 14 are respectively coupled to an input source indicative of the component values $w_R$ and $w_I$ of the resolved twiddle factor, w, whereby the components $(vw)_R$ and $(vw)_I$ of the resolved complex product vw appear at the respective outputs of elements 41 and 42. Element 51A of the complex adder is responsively coupled to the output of element 41 and a source (not shown) indicative of the component value $u_R$ (of the resolved complex value u) to provide the output $x_R$, while adder element 51B is responsively coupled to the output of element 42 and a source (not shown) indicative of the component value $u_I$, to provide the output $x_I$, whereby complex adder 51A and 51B is seen to cooperate to provide the respective real and imaginary sums indicated by Equations (14a) and (14b).

Element 52A of the complex subtractor is responsively coupled to the output of element 41 and to the source (not shown) of signal $u_R$, while element 52B is responsively coupled to the output of element 42 and the source (not shown) of signal $u_I$, whereby complex subtractor 52A and 52B cooperates to provide the respective real and imaginary differences indicated by Equations (15a) and (15b), of the decimate-in-time type FFT butterfly arithmetic process.

Although the decimate-in-time type device of FIG. 4 is illustrated as employing as element 44 that embodiment of complex multiplier shown in FIG. 1, it is to be understood that the concept illustrated by the arrangement in FIG. 4 is not so limited, and the complex multiplier embodiment of FIG. 2 may be substituted therefor, as shown in FIG. 6. Similarly, it is also to be understood that, while the decimate-in-frequency type device of FIG. 3 is illustrated as employing as element 44 that embodiment of complex multiplier shown in FIG. 1, the concept illustrated by the arrangement of FIG. 3 is not so limited and the complex multiplier embodiment of FIG. 2 may be substituted therein, as shown in FIG. 5.

Accordingly, there has been illustrated a highly useful improvement in digital arithmetic for effecting complex multiplication and for performing FFT butterfly arithmetic by means of look-up type square function memories in a quarter-square type multiplier arrangement. The utility of such square function look-up table type mechanization is, in turn, promoted by the square-by-parts parallel data processing concept disclosed in my above-noted co-pending Application Ser. No. 130,653 filed Mar. 17, 1980, whereby the density of the memory requirement may, as an extremely practical matter, be substantially reduced and significantly abbreviated, and the data processing speed correspondingly increased.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A digital arithmetic device for processing data and performing multiplication of two complex values, $A=(A_R+jA_I)$ and $B=(B_R+jB_I)$ and comprising:

four data input ports designated $A_R$, $B_R$, $A_I$ and $B_I$, respectively, and organized as four pairs of components of both said component values as four pairs of input ports, $(A_R, B_R)$, $(A_I, B_R)$, $(A_R, B_I)$, $(A_I, B_I)$;

eight square function memories;

a first, second, third and fourth one of said memories responsively coupled to at least a respective one of said input ports as memory inputs for providing values indicative of the respective squares of said memory inputs;

a fifth, sixth, seventh and eighth one of said memories responsively coupled to a mutually exclusive pair of the four input pairs of said input ports for providing values indicative of the respective squares of a preselective combination of said mutually exclusive input pairs;

a first digital combining means responsively coupled to the outputs of at least said first and fifth memories for providing an output indicative of the product $A_R B_R$;

a second digital combining means responsively coupled to the outputs of at least said second and sixth memories for providing an output indicative of the product $A_I B_R$;

a third digital combining means responsively coupled to the outputs of at least said third and seventh memories for providing an output indicative of the product $A_I B_I$;

a fourth digital combining means responsively coupled to the outputs of at least said fourth and eighth memories for providing an output indicative of the product $A_R B_I$;

a first digital combiner responsively coupled to the outputs of said first and third digital combining means for providing an output indicative of the real component of the complex product AB; and a second digital combiner responsively coupled to the output of said second and fourth digital combining means for providing an output indicative of the imaginary component of the complex product AB.

2. The device of claim 1 and further including ancillary arithmetic means for providing a decimate-in-time type FFT butterfly arithmetic function comprising:

a complex adder having a first pair of ports, each port coupled to a respective output of said complex multiplier, and further having a second pair of input ports; and a complex subtractor having a first pair of ports, each port coupled to a respective output of said complex multiplier, and further having a second pair of input ports.

3. The device of claim 1 and further including ancillary arithmetic means for providing a decimate-in-frequency type FFT butterfly arithmetic function comprising:

a complex subtractor interposed at said first and third input ports of said complex multiplier and having a pair of inputs representing a third complex variable; and a complex adder having a first pair of inputs coupled to said complex multiplier first and third input ports which are interposed by said complex subtractor, and further having a second set of inputs, each coupled to a respective input of said pair of inputs of said complex subtractor.

4. A digital arithmetic device for performing multiplication of two complex values, $A=(A_R+jA_I)$ and $B=(B_R+jB_I)$, and comprising:

four input ports designated $A_R$, $B_R$, $A_I$ and $B_I$, respectively;

four input summing means;

eight square function memories;

a first, second, third and fourth one of said memories responsive to a respective one of said input ports for providing values indicative of the respective squares thereof, $A_R^2$, $A_I^2$, $B_R^2$, $B_I^2$;

a fifth, sixth, seventh and eighth one of said memories responsive to a respective one of said four input summing means, each of said input summing means being responsive to a mutually exclusive pair of the four input pairs of said input ports $(A_R, B_R)$, $(B_R, A_I)$, $(A_I, B_I)$, and $(B_I, A_R)$ for providing values indicative of the respective squares of said respective summed input pairs $(A_R+B_R)^2$, $(B_R+A_I)^2$, $(A_I+B_I)^2$ and $(B_I+A_R)^2$;

a first digital combining means responsively coupled to the outputs of said first, second and fifth memories for providing an output indicative of the product $A_R B_R$;

a second digital combining means responsively coupled to the outputs of said second, third and sixth memories for providing an output indicative of the product $A_I B_R$;

a third digital combining means responsively coupled to the outputs of said third, fourth and seventh memories for providing an output indicative of the product $A_I B_I$;

a fourth digital combining means responsively coupled to the outputs of said first, fourth and eighth memories for providing an output indicative of the product $A_R B_I$;

a subtractor responsively coupled to the outputs of said first and third digital combining means for providing an output indicative of the real component of the complex product AB; and an adder responsively coupled to the output of said second and fourth digital combining means for providing an output indicative of the imaginary component of the complex product AB.

5. A digital arithmetic device for performing multiplication of two complex values, $A=(A_R+jA_I)$ and $B=(B_R+jB_I)$ and comprising:

four input ports for receiving signals designated $A_R$, $B_R$, $A_I$ and $B_I$, respectively;

summing means for algebraically summing the signals at said ports to provide signals representing $(A_R+B_R)$, $(B_R+A_I)$, $(A_I+B_I)$, $(B_I+A_R)$, $(A_R-B_R)$, $(B_R-A_I)$, $(A_1-B_I)$, and $(B_I-A_R)$;

eight square function memories;

a first, second, third and fourth one of said memories responsive to a respective sum of the signals at a pair of said input ports for providing value indicative of the respective squares of said respective sums $(A_R+B_R)^2$, $(B_R+A_I)^2$, $(A_I+B_I)^2$ and $(B_I+A_R)^2$;

a fifth, sixth, seventh and eighth one of said memories responsive to a difference between the signals at the ports of a mutually exclusive pair of said input ports for providing values indicative of the respective squares of said respective differences $(A_R-B_R)^2$, $(B_R-A_I)^2$, $(A_I-B_I)^2$ and $(B_I-A_R)^2$;

a first digital combining means responsively coupled to the outputs of said first and fifth memories for providing an output indicative of the product $A_R B_R$;

a second digital combining means responsively coupled to the outputs of said second and sixth memories for providing an output indicative of the product $A_I B_R$;

a third digital combining means responsively coupled to the outputs of said third and seventh memories for providing an output indicative of the product $A_I B_I$;

a fourth digital combining means responsively coupled to the outputs of said fourth and eighth memories for providing an output indicative of the product $A_R B_I$;

a first algebraic adder responsively coupled to the outputs of said first and third digital combining means for providing an output indicative of the real component of the complex product AB; and a second algebraic adder responsively coupled to the output of said second and fourth digital combining means for providing an output indicative of the imaginary component of the complex product AB.

6. A digital arithmetic device for performing complex multiplication of two complex numbers, $A=(A_R+jA_I)$ and $B=(B_R+jB_I)$ and comprising:

a plurality of input ports, each adapted to be responsive to a mutually exclusive one of the values $(A_R, B_R, A_I, B_I)$ of the complex components of said complex numbers, a respective complex component of each of said two complex numbers forming a mutually exclusive pair of values $(A_R, B_R)$, $(A_I, B_R)$, $(A_I, B_I)$, $(A_R, B_I)$;

first ROM-based quarter-square multiplier means responsive to a first one $(A_R, B_R)$ of said pairs of values to provide an output indicative of the product thereof $(A_R B_R)$;

second ROM-based quarter-square multiplier means responsive to a second one $(A_I, B_R)$ of said pairs of values to provide an output indicative of the product thereof $(A_I B_R)$;

third ROM-based quarter-square multiplier means responsive to a third one $(A_I, B_I)$ of said pairs of values to provide an output indicative of the product thereof $(A_I B_I)$;

fourth ROM-based quarter-square multiplier means responsive to a fourth one $(A_R, B_I)$ of said pairs of values to provide an output indicative of the product thereof $(A_R B_I)$;

first digital combining means responsive to said first and third quarter-square multiplier for providing an output indicative of a first complex component of the complex product (AB); and second digital combining means responsive to said second and fourth quarter-square multipliers for providing an output indicative of a second complex component of the complex product (AB).

7. A decimate-in-frequency type FFT butterfly arithmetic unit comprising:

complex addition means for adding the complex variable v to the complex variable u to provide the complex variable $x=x_R+jx_I$ where $x_R=u_R+v_R$ and $x_I=u_I+v_I$;

complex subtraction means for subtracting the complex variable v from the complex variable u; and a ROM-based complex multiplier including ROM's functioning as square function look-up tables responsive to the complex components of the twiddle factor w and of the complex subtraction to provide a complex output indicative of the complex variable $y=y_R+jy_I$ where $Y_R=(u_R-v_R)w_R-(u_I-v_I)w_I$ and $Y_I=(u_I-v_I)w_R+(u_R-v_R)w_I$.

8. The device of claim 7 in which said complex multiplier comprises:

four input ports, a first and third input port responsively coupled to said complex subtraction means, a second and fourth input port designated $w_R$ and $w_I$, respectively;

four input summing means;

eight square function memories;

a first, second, third and fourth one of said memories responsive to a respective one of said input ports for providing values indicative of the respective squares thereof, a fifth, sixth, seventh and eighth one of said memories responsive to a respective one of said four input summing means, each of said input summing means being responsive to a mutually exclusive pair of the four input pairs of said input ports for providing values indicative of the respective squares of said respective summed input pairs;

a first digital combining means responsively coupled to the outputs of said first, second and fifth memories for providing an output indicative of a first product;

a second digital combining means responsively coupled to the outputs of said second, third and sixth memories for providing an output indicative of a second product;

a third digital combining means responsively coupled to the outputs of said third, fourth and seventh memories for providing an output indicative of a third product;

a fourth digital combining means responsively coupled to the outputs of said first, fourth and eighth memories for providing an output indicative of a fourth product;

a subtractor responsively coupled to the outputs of said first and third digital combining means for providing an output indicative of the real component of the complex product $(u-v)w$; and an adder responsively coupled to the output of said second and fourth digital combining means for providing an output indicative of the imaginary component of the complex product $(u-v)w$.

9. The device of claim 7 in which said complex multiplier comprises:

four input ports, a first and third input port responsively coupled to said complex subtraction means a second and fourth input port designated $w_R$ and $w_I$, respectively;

eight ROM-based square function memory means;

a first, second, third and fourth one of said memory means responsive to a respective sum of the signals at a pair of said input ports for providing values indicative of the respective squares of said respective sums, a fifth, sixth, seventh and eighth one of said memory means responsive to a difference between the signals at the ports of a mutually exclusive pair of said input ports for providing values indicative of the respective squares of said respective differences;

a first digital combining means responsively coupled to the outputs of said first and fifth memories for providing an output indicative of a first product;

a second digital combining means responsively coupled to the outputs of said second and sixth memories for providing an output indicative of a second product;

a third digital combining means responsively coupled to the outputs of said third and seventh memories for providing an output indicative of a third product;

a fourth digital combining means responsively coupled to the output of said fourth and eighth memories for providing an output indicative of a fourth product;

a first adder responsively coupled to the output of said first and third digital combining means for providing an output indicative of the real component of the complex product $(u-v)w$; and a second adder responsively coupled to the input of said second and fourth digital combining means for providing an output indicative of the imaginary component of the complex product $(u-v)w$.

10. A decimate-in-time type FFT butterfly arithmetic unit comprising:

a ROM-based complex multiplier including ROM's functioning as square function look-up tables for multiplying the complex value v by the complex twiddle factor w to provide the component values $(wv)_R$ and $(wv)_I$ of the complex product;

complex subtraction means responsive to the complex outputs of said complex multiplier and to a complex input u for providing an output indicative of the complex variable $y=y_R+jy_I$ where $y_I=u_I-(wv)_I$ and $y_R=+u_R-(wv)_R$; and complex addition means responsive to the complex output of said complex multiplier and to the complex input u for providing an output indicative of the complex variable $x-x_R+jx_I$ where $x_R=u_R+(wv)_R$ and $x_I=u_I+(wv)_I$.

11. The device of claim 10 in which said complex multiplier comprises:

four input ports designated $v_R$, $w_R$, $v_I$ and $w_I$, respectively;

four input summing means;

eight square function memories;

a first, second, third and fourth one of said memories responsive to a respective one of said input ports for providing values indicative of the respective squares thereof, $v_R^2$, $v_I^2$, $w_R^2$, $w_I^2$, a fifth, sixth, seventh and eighth one of said memories responsive to a respective one of said four input summing means, each of said input summing means being responsive to a mutually exclusive pair of the four input pairs of said input ports $(w_R, v_R)$, $(w_R, v_I)$, $(w_I, v_I)$, and $(w_I, v_R)$ for providing values indicative of the respective squares of said respective summed input pairs $(v_R+v_R)^2$, $(w_R+v_I)^2$, $(v_I+w_I)^2$ and $(w_I+v_R)^2$;

a first digital combining means responsively coupled to the outputs of said first, second and fifth memories for providing an output indicative of the product $v_R w_R$;

a second digital combining means responsively coupled to the outputs of said second, third and sixth memories for providing an output indicative of the product $v_I w_R$;

a third digital combining means responsively coupled to the outputs of said third, fourth and seventh memories for providing an output indicative of the product $v_I w_I$;

a fourth digital combining means responsively coupled to the outputs of said first, fourth and eighth memories for providing an output indicative of the product $v_R w_I$;

a subtractor responsively coupled to the outputs of said first and third digital combining means for providing an output indicative of the real component of the complex product vw; and an adder responsively coupled to the output of said second and fourth digital combining means for providing an output indicative of the imaginary component of the complex product vw.

12. The device of claim 10 in which said complex multiplier comprises:

four input ports designated $v_R$, $w_R$, $v_I$ and $w_I$, respectively;

eight ROM-based square function memory means;

a first, second, third and fourth one of said memory means responsive to a respective sum of a pair of said input ports for providing values indicative of the respective squares of said respective sums $(v_R+w_R)^2$, $(v_R+w_I)^2$, $(v_I+w_I)^2$ and $(w_I+v_R)^2$;

a fifth, sixth, seventh and eighth one of said memory means responsive to a difference between the ports of a mutually exclusive pair of said input ports for providing values indicative of the respective squares of said respective differences $(v_R-w_R)^2$, $(w_R-v_I)^2$, $(v_I-w_I)^2$ and $(w_I-v_R)^2$;

a first digital combining means responsively coupled to the outputs of said first and fifth memories for providing an output indicative of the product $v_R w_R$;

a second digital combining means responsively coupled to the outputs of said second and sixth memories for providing an output indicative of the product $v_I w_R$;

a third digital combining means responsively coupled to the outputs of said third and seventh memories for providing an output indicative of the product $v_I w_I$;

a fourth digital combining means responsively coupled to the outputs of said fourth and eighth memories for providing an output indicative of the product $v_R w_I$;

a first algebraic adder responsively coupled to the outputs of said first and third digital combining means for providing an output indicative of the real component of the complex product vw; and a second algebraic adder responsively coupled to the outputs of said second and fourth digital combining means for providing an output indicative of the imaginary component of the complex produce vw.

* * * * *

UNITED STATES PATENT AND TRADEMARK OFFICE
CERTIFICATE OF CORRECTION

PATENT NO. : 4,344,151
DATED : August 10, 1982
INVENTOR(S) : Stanley A. White

It is certified that error appears in the above-identified patent and that said Letters Patent are hereby corrected as shown below:

In column 2, line 38, please delete "lock-up" and insert --look-up--.
In column 6, line 26, please delete "$A^3$" and insert --$A^2$--.
In column 6, line 61, please delete "133" and insert --113--.
In column 10, line 10, please delete "$B_R$" and insert --$B_I$--.
In column 10, line 14, please delete "$B_R$" and insert --$B_I$--.

In column 11, line 12, please delete "$B_R$" and insert --$B_I$--.
In column 11, line 16, please delete "$B_R$" and insert --$B_I$--.

UNITED STATES PATENT AND TRADEMARK OFFICE
CERTIFICATE OF CORRECTION

PATENT NO. : 4,344,151     Page 2 of 2
DATED : August 10, 1982
INVENTOR(S) : Stanley A. White It is certified that error appears in the above-identified patent and that said Letters Patent are hereby corrected as shown below:

In column 11, line 60, please delete "$B_R$" and insert --$B_I$--.
In column 11, line 64, please delete "$B_R$" and insert --$B_I$--.
In column 12, line 46, please delete "$v_R$" and insert --$v_I$--.

In column 14, line 59, please delete "$w_R$" and insert --$w_I$--.
In column 14, line 64, please delete "$w_R$" and insert --$w_I$--.
In column 16, line 10, please delete "$w_R$" and insert --$w_I$--.
In column 16, line 14, please delete "$w_R$" and insert --$w_I$--.
In column 16, line 20, please delete "outputs" and insert --output--.

Signed and Sealed this

Eleventh Day of December 1984

[SEAL]

Attest:

GERALD J. MOSSINGHOFF

Attesting Officer     Commissioner of Patents and Trademarks